March 23, 1965  G. R. ROSE  3,175,139
SEQUENTIAL MOTOR CONTROL FOR MECHANIZED FEEDING
Filed March 28, 1963  3 Sheets-Sheet 1

INVENTOR.
GLENN R. ROSE
BY
Dugger, Braddock, Johnson & Westman
ATTORNEYS

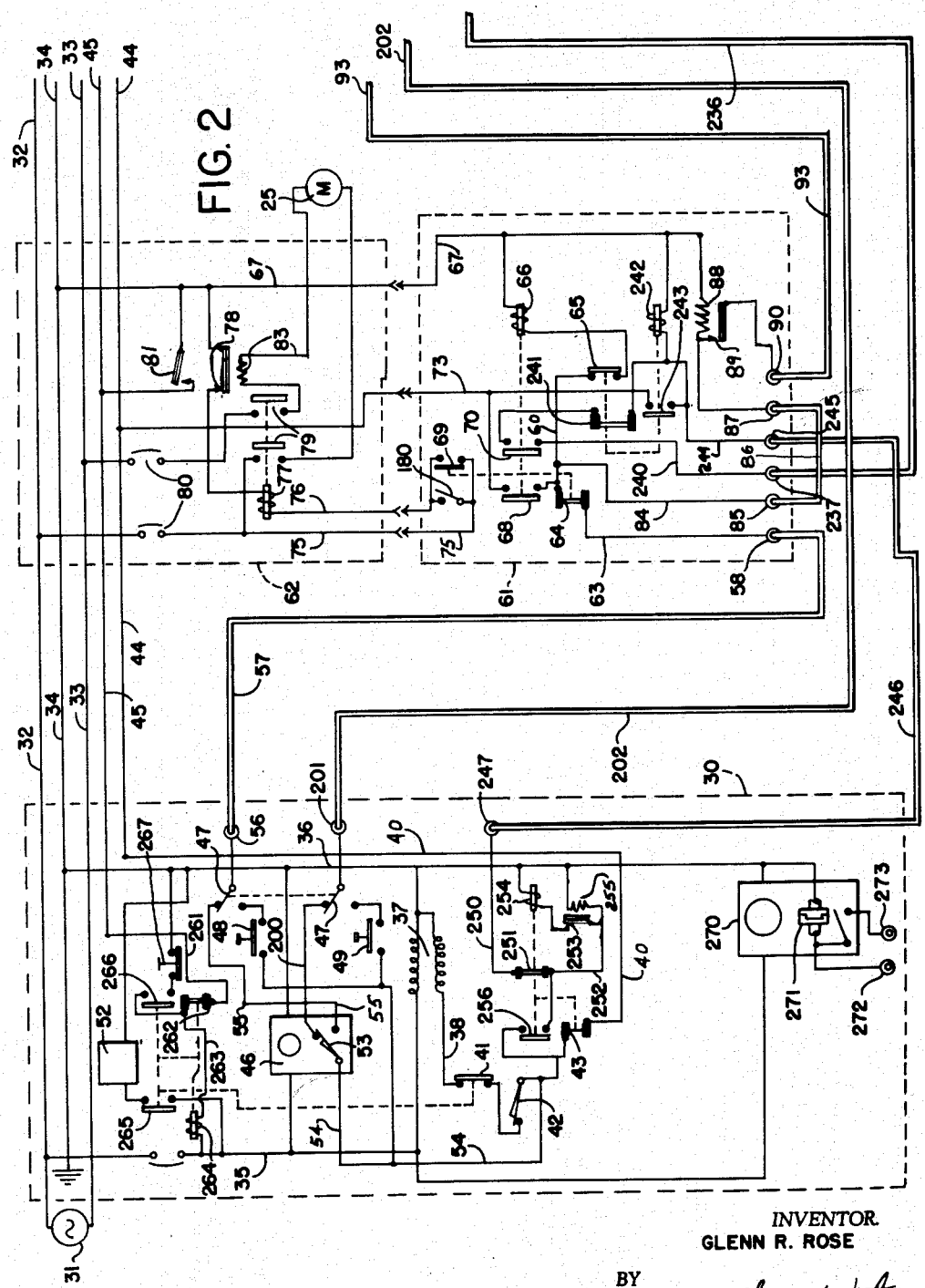

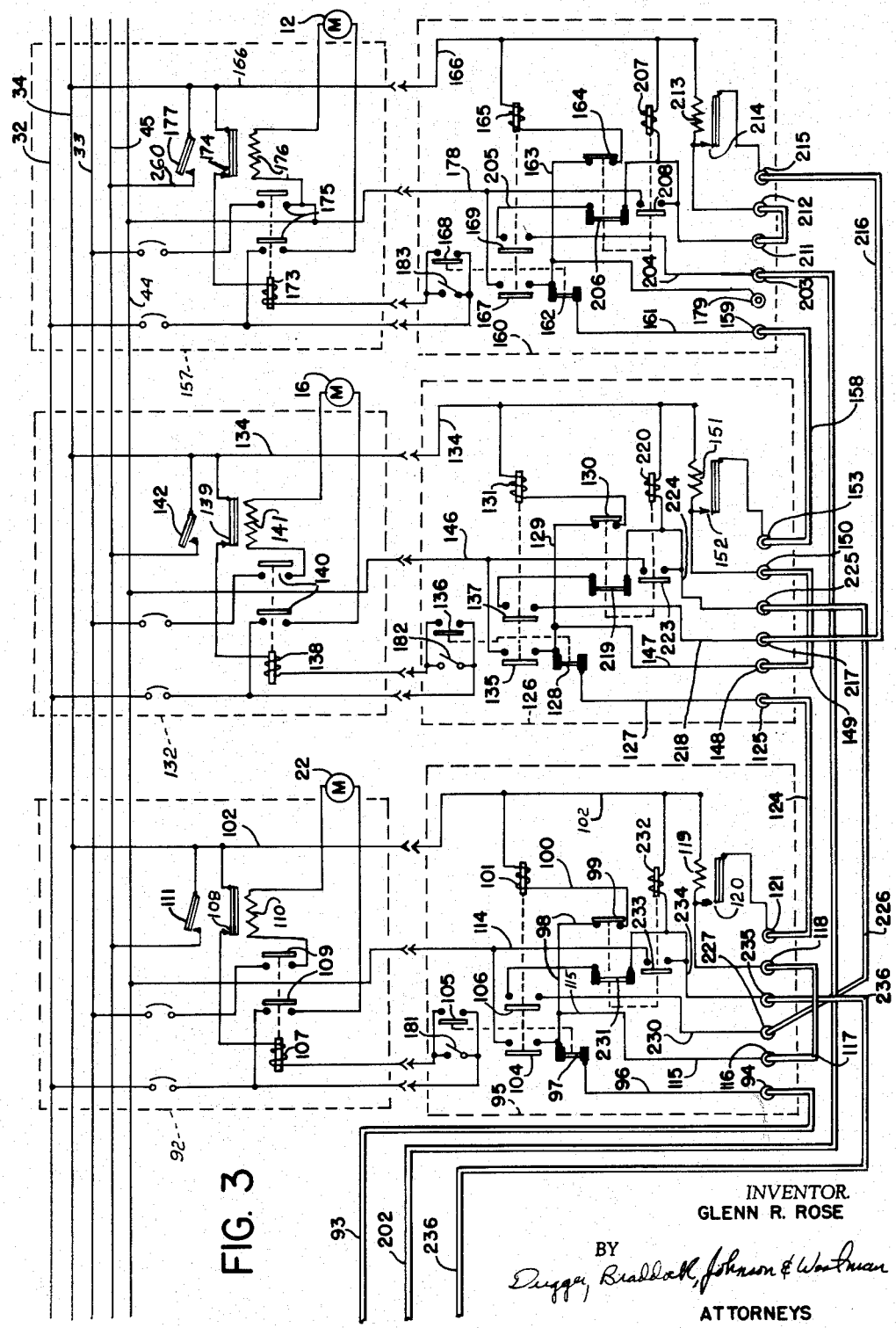

United States Patent Office 3,175,139
Patented Mar. 23, 1965

3,175,139
SEQUENTIAL MOTOR CONTROL FOR
MECHANIZED FEEDING
Glenn R. Rose, St. Paul, Minn., assignor to Programmed & Remote Systems Corporation, St. Paul, Minn., a corporation of Minnesota
Filed Mar. 28, 1963, Ser. No. 268,643
7 Claims. (Cl. 318—102)

The present invention has relation to programming devices and more particularly to an automatic control system for livestock feeding mechanism which can be programmed in a predetermined sequence to obtain the necessary functions of the various components in the mechanized feeding setup.

The mechanization of cattle feeding has long been of interest to farm operators. Usually when farmers or ranchers wish to mechanize their feeding operations they think in terms of high-speed, large capacity equipment which will accomplish the job of feeding in a short time. The farmers also think in terms of always being on hand to watch the feeding operation. Most installations use manual start and stop buttons for the motors that are used to drive the feeding components.

The cost of high capacity equipment is very high and the capital investment that is necessary becomes prohibitive in many cases.

The second approach to the problem is to use low-capacity equipment and run it for a longer period of time during each of the feeding cycles. In order to do this it is absolutely necessary that the controls for the various motors used are fully automatic and timed so that the farmer does not have to be on hand to start and stop the equipment. Automatic operation frees the farmer to do other work and at the same time permits him to feed a large number of cattle.

A major advantage of low-capacity equipment is that the initial cost is relatively low. For example, the electric motors used can be low horsepower. The cost of electric motors rises astronomically as the horsepower increases. Low horsepower motors are readily adapted for use on existing power lines and special transmission lines do not have to be installed.

The problems in controlling the equipment in a mechanized livestock feed lot are manyfold. Each feed lot has its own particular conditions that have to be met (type of equipment, size of lot, shape of lot), at the same time, more than one ration may have to be fed.

The present invention presents a programming system for livestock feeding which utilizes a very simplified electrical circuit. The programming system consists of a master control unit which provides the starting and stopping signals for any number of motors in the stystem. A separate motor starter and logic unit for each of the motors is also used. The control sequence between the various units is regulated and changed through the use of "patch cords" that can be plugged into appropriate receptacles in the logic unit to obtain the desired program.

The control or programming system can be utilized to turn on the various motors driving the feeding equipment in any desired sequence, permit the motor to run for a desired length of time and then shut down the motors in a sequence which may be different from the sequence of starting the motors.

It is an object of the present invention to present a simplified control circuit for programming the automatic feeding of livestock.

It is a further object of the present invention to present control units that are easily installed and can be programmed to provide any desired sequence of operation.

Other and further objects are those inherent in the invention here illustrated, described, and claimed and will become apparent as the description proceeds.

To the accomplishment of the foregoing and related ends, this invention then comprises features hereinafter fully described and particularly pointed out in the claims, the following description setting forth in detail certain illustrative embodiments of the invention, these being indicative, however of but a few of the various ways in which the principles of the invention may be employed.

The invention is illustrated by reference to the drawings in which corresponding numerals refer to the same parts, and in which:

FIGS. 2 and 3 are schematic representations of a common control circuit and logic units used for controlling the mechanized feeding system illustrated in FIG. 1.

*General discussion of the system*

Figure 1:
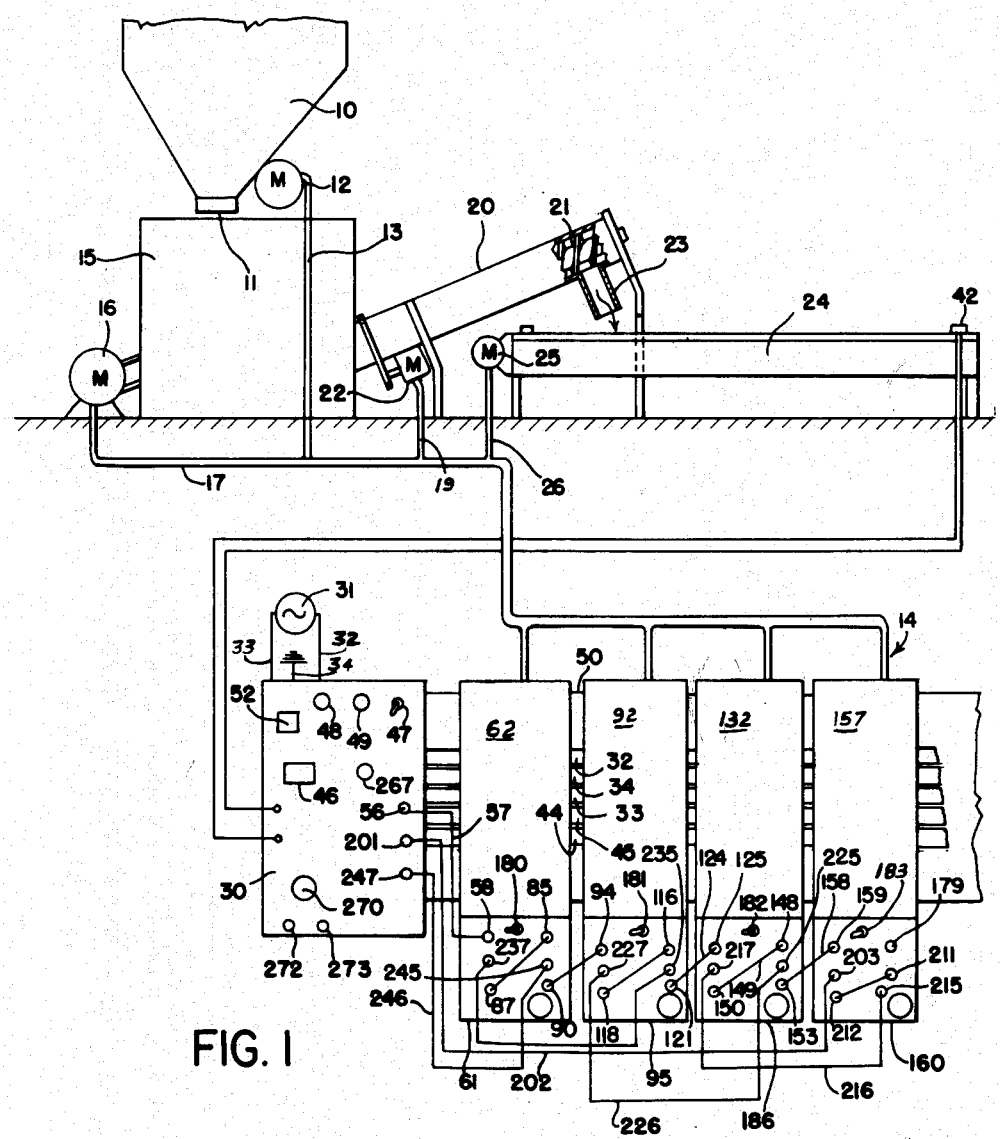
FIG. 1 is a schematic representation of a mechanized livestock feeding operation having control units made according to the present invention.

Referring specifically to FIG. 1, a simplified schematic representation of a typical feed lot installation is shown. A large storage bin 10 for grain and other feed is mounted near the feed lot. The bin 10 has a vibrator type feeder 11 mounted thereunder which is driven with an electric motor 12. The electric motor 12 is wired through suitable conduits 13 to a control center illustrated generally at 14. The vibrator feeder 11 discharges directly into a mill 15 of any usual or preferred construction which can be used for grinding the grain. The mill is driven with a motor 16. The motor 16 is connected through a conduit 17 to the control center 14.

A discharge auger assembly 20 is positioned to receive the output or discharge from the mill 15. The auger assembly 20 has a screw flight 21 that is driven through a motor 22. The motor 22 is also connected through a suitable conduit 19 to the control center 14.

The auger screw 21 moves the grain from the mill through a discharge spout 23 and deposits it into a bunk feeder 24. The bunk feeder 24 has any usual or preferred mechanism for moving the ground grain therealong. The mechanism in the bunk feeder 24 is driven with an electric motor 25 that is connected through a conduit 26 to the control center 14.

The starting sequence of the various components, which function interdependently, must be such that there is no piling up of the grain being fed. This is particularly important when low horsepower motors are used. By starting the motors in proper sequence, the motors will never have to be started under full load. Thus, the motor 25 for the bunk feeder 24 must be started first. Then the motor 22 for the auger assembly 20 is started and subsequently the motor 16 for the mill 15. In this manner anything that is discharged from the mill will be immediately carried to the bunk feeder and distributed as desired. The last motor to be started is motor 12 for the feeder 11, which will feed grain into the mill 15.

After the feeding cycle is complete, the motors must always be stopped in proper sequence so that all of the components will "empty out" before they are stopped. The motor then will not have to start under load when the next feeding cycle is initiated.

Motor 12 to the bin 10 must be shut off first so that grain no longer is supplied to the mill 15. Then, after a predetermined time, delay, which allows the mill, auger and bunk feeder to clean out, these components are stopped. The control system is then reset so that when the system is again started, it will repeat the initial starting sequence.

The mechanized bunk feeding components can be controlled through a 24-hour timer so that the units can be started at any time during the day or night and will run for any desired length of time in order to complete the feeding operation before shutting themselves off. Suitable safety devices are included in the circuit so that if there is a malfunction, the unit will shut itself off entirely and will not continue to operate. Because of this the farmer only has to check very infrequently to make sure that nothing has malfunctioned. The farmer does not have to be present to start the feeding cycle nor does he have to be present to stop the feeding cycle.

*Common control components*

In all of the programming systems made according to the present invention, regardless of number of motors, there is a common control unit 30 in the circuit. The unit 30 is represented by dotted lines in FIG. 2. The various electric motors which are driven are supplied power from a power source 31 which, as shown, is a 220 volt, three-wire, single phase service. This service is standard in the rural areas of the country. The power is carried through a first power line 32 and a second power line 33, which each carry 110 volts, and a neutral or ground line 34. 110 volts can be used by connecting across one of the power lines and the ground line. 220 volt current supplied by connecting across the two power lines 32 and 33.

The programming or sequence of operation of the various motors is determined through the use of "patch cords" which have plugs at either end thereof and are adapted to be plugged into various jacks or receptacles of the control system. In order to prevent hazardous shocks, all of the patch cords carry 24 volts. High voltage is not carried in the parts of the unit which are used in the programming cycle and which could be touched accidentally by the operator.

A main control power line 35 is electrically connected to first power line 32 and leads into the common control unit 30. A control ground line 36 is connected to ground line 34. The power line 35 carries 115 volts. A transformer 37 has an output line 38 which carries 24 volts. The output line from the transformer 37 is connected through a pair of normally closed contacts 41, a normally closed microswitch 42 (which will be more fully explained later) through a pair of normally closed contacts 43 and then is electrically connected through a line 40 to a 24-volt steady signal line or bus bar 44, which extends to all of the units. In addition to the 24-volt signal line 44 and the power lines 32, 33 and 34, there is an overload of alarm control line 45 which extends to all of the motor controller units. In the commercial form of the invention, lines 32, 33, 34, 44 and 45 extend from the common control unit 30 in the form of bus bars illustrated in FIG. 1. The bus bars are mounted on a backing board 50 and the motor controllers, which will be more fully explained later, are plugged directly onto the bus bars. Thus, when it is desired to add on another motor in the control sequence, the motor control unit is merely plugged onto the bus bars and suitable wires connected to the motor that is to be controlled. Only one 24-volt signal line is necessary to operate the programming circuits.

A 24-hour timer 46 is electrically connected between lines 35 and 36 and operates on 115 volts. The 24-hour timer 46 determines the time at which the feeding system is started and how long it runs before it will be shut off. The timer is used for automatic operation.

The unit is also designed so that it can be used manually. If used manually, an "automatic-manual" switch 47 is moved to the "manual" position and then a start push button switch 48 can operate the system. The system is stopped manually by a second push button switch 49. For the purposes of illustration, the unit will be described as it is automatically run.

An overload alarm illustrated schematically at 52 is also provided. The circuit for operating the overload alarm will be more fully explained later.

As shown schematically in FIG. 2, when the timer 46 reaches the time that the feeding mechanism is to be started, it trips a microswitch 53. The microswitch is electrically connected to the transformer 37 through line 38 (which carries 24 volts) normally closed contacts 41, normally closed microswitch 42, and a line 54. The microswitch 53 connects line 54 to a line 55. The line 55 is electrically connected through the automatic-manual switch 47 to a "start" jack 56. Thus, when the unit is to start, a 24-volt signal appears at the jack 56.

*Starting of motors for feeding equipment*

The 24-volt signal appearing at jack 56 is utilized for starting the first motor in the series. The motor 25 for the bunk feeder 24 will be started first. The jack 56 is connected through a jumper or "patch cord" 57 to an input jack 58 on a first logic unit 61. The logic unit 61 is connected directly to a motor controller 62. The logic units are designed so that they plug-on to the motor controllers. The electrical connection between the logic unit and its associated motor controller plug together.

The first logic unit 61 receives the 24-volt signal at input jack 58 which is electrically connected through a line 63, a first set of normally closed contacts 64, a line 60, a second set of normally closed contacts 65 to a start sequence solenoid coil 66. The solenoid coil 66 is further electrically connected to a ground line 67 which is connected to the ground bus bar 34.

The solenoid coil 66 controls normally closed contacts 64, a pair of normally open contacts 68, a pair of normally open contacts 69 and a pair of normally open contacts 70. The normally open contacts 68 and normally closed contacts 64 are of the "make before break" type. Contacts 68 close or "make" before contacts 64 open. One side of the normally open contacts 68 is electrically connected through a line 73 which extends through the motor controller 62 and is electrically connected to the steady 24-volt signal bus bar or line 44. The other side of contacts 68 is connected electrically to the solenoid coil 66 through line 60 normally closed contacts 65. The solenoid is then locked in and powered independently of the signal appearing at jack 58 through lines 73 and 60 and contacts 68 and 65.

Once the solenoid 66 is energized, contacts 69 and 70 both close as well. Contacts 69 complete a circuit through a line 75 extending from 115 volt power line 32, and a line 76, to a motor starter solenoid coil 77. The solenoid coil is also connected through a set of normally closed contacts 78 to ground line 67. The solenoid coil 77, when it is energized, closes a pair of contacts 79, 79 which in turn electrically connect motor 25 to the power lines 32 and 33. The motor 25 is connected through circuit breakers 80.

An overload relay heater 83 is wired in the electric motor circuit and the function of the overload relay coil will be more fully explained later. The overload relay 83 controls contacts 78 and a set of normally open contacts 81. When contacts 81 close they will connect ground line 67 to overload alarm line 45, contacts 78 and 81 are heat responsive.

It will be seen that once contacts 68 and 69 are closed motor 25 is started and the solenoid coil 66 is locked in the energized or on position. The 24-volt line 73 is connected through contacts 68 to a line 84 which leads to a plug or output jack 85. When the motor 25 has started a 24-volt signal will appear at jack 85.

A patch cord 86 is, as shown, electrically connected to jack 85 and is also connected to an input jack 87 leading to a time delay heater 88. The heater coil 88 is also connected to ground line 67 in the logic unit 61. The time delay heater is a standard component made so that a predetermined time after it has been energized, contacts 89, which are connected to a bi-metallic strip and controlled by the heater will close. This in turn will close the circuit so that the 24-volt signal appears at a time delay output jack 90. The time delay is utilized to permit motor 25 to get up to speed before the next motor is started.

A patch cord 93 is plugged into jack 90 and is in turn connected to a jack 94 (see FIG. 3) in a second logic unit 95 which is plugged into a motor controller 92 for the motor 22 which drives the auger 20. The circuit in logic unit 95 is the same as in the logic unit 61. The 24-volt signal from the patch cord 93, which appears a known time after motor 25 has started is carried through a line 96, a set of first normally closed contacts 97, a line 98, through a set of second normally closed contacts 99 and through a line 100 to a start sequence solenoid coil 101. The solenoid coil 101 is also electrically connected to a ground line 102 which is connected to the ground bus bar 34. When the solenoid coil 101 is energized it simultaneously operates four sets of contacts. The coil 101 operates contacts 97 and a set of normally open contacts 104, which close before contacts 97 open. It also closes a set of normally open contacts 105 and a set of normally open contacts 106.

Contacts 105 electrically connect a motor starting solenoid 107 to power line 32. The starting solenoid 107 is also connected through a set of normally closed contacts 108 to ground line 102. The solenoid 107 operates a pair of motor starter contacts 109 which close and energize the auger motor 22 from the main power lines. An overload relay heater 110, which controls contacts 108 and a set of normally opened contacts 111 is connected in the motor circuit. The normally open contacts 111, when they are closed, connect ground line 102 with the overload alarm bus bar 45. Contacts 108 and 111 are heat responsive.

When the contacts 104 close (which correspond to contacts 68 in the first unit), the solenoid coil 101 for the starting circuit of motor 22 is locked on through a 24-volt line 114, contacts 104 and 99 and lines 98 and 100. The line 114, which is connected to the main bus bar or line 44 is also electrically connected through contacts 104 and a line 115 to an output jack 116. The jack 116 is connected through a patch cord 117 to a time input jack 118. The time delay input jack is electrically connected to a time delay heater 119 that is electrically connected to ground line 102. After a predetermined time delay a set of heat responsive contacts 120 are closed and connect the 24-volt signal appearing at jack 118 to a time delay output jack 121. The motor 22 will get up to full speed before contacts 120 close.

The time delay output jack 121 is electrically connected through a patch cord 124 to a start input jack 125 of a third logic unit 126. The third logic unit 126 is utilized for controlling the third motor in the start sequence, motor 16 for mill 15. The logic unit is plugged into a motor controller 132. The 24-volt signal appearing at jack 125 is carried through a line 127, a set of normally closed contacts 128, a line 129, a set of normally closed contacts 130 and is connected to a start sequence solenoid coil 131. The start sequence solenoid coil is also connected to a ground line 134 which in turn is connected to ground line 34.

The solenoid 131 controls normally closed contacts 128, and a pair of normally open contacts 135, which will close and make contact before contacts 128 open. The solenoid 131 also controls a pair of normally open contacts 136 and a pair of normally open contacts 137. When the solenoid is energized, contacts 135, 136 and 137 close and contacts 128 open. Contacts 136 close a circuit from power line 32 to a starting solenoid 138 that is electrically connected through a set of normally closed contacts 139 to ground line 134. The solenoid 138, when it is energized, closes motor control contacts 140 and the motor 16 is started.

An overload heater 141 is also included in the motor circuit. The heater 141 controls normally closed contacts 139 as well as a pair of normally open contacts 142 which, when closed, will electrically connect ground line 134 with the overload alarm bus bar or line 45.

As in the previous logic units, when the contacts 135 are closed solenoid 131 is electrically connected to a line 146 that is electrically connected to the 24-volt bus bar 44. The solenoid 131 is thus locked on through lines 146 and 124 and contacts 130 and 135. Contacts 135 also connect the 24-volt line 146 to a line 147 that is connected to a start output jack 148. Once the contacts 135 are closed a 24-volt signal appears at jack 148. A patch cord 149 is utilized to connect the jack 148 with a time delay input jack 150 which is electrically connected to a time delay heater 151. Heater 151 in turn is electrically connected to ground line 134. A predetermined time after heater 151 is energized a set of contacts 152 will close and complete a circuit from input jack 150 to a time delay output jack 153.

After the motor 16 has come up to speed, (during operation of the time delay relay) the last motor in the sequence, or motor 12 for the vibrate feeder 11 can be energized. Jack 153 is electrically connected through a patch cord 158 to a start input jack 159 in a fourth logic unit 160. The fourth logic unit is plugged into a fourth motor controller 157. The start sequence input jack 159 is electrically connected through a line 161, a normally closed set of contacts 162, a line 163 and through a normally closed set of contacts 164 to a start sequence solenoid coil 165. The start sequence solenoid coil 165 is also electrically connected to a ground line 166 which in turn is electrically connected to the ground bus bar 34.

The solenoid coil 165 controls the normally closed contacts 162 as well as a pair of normally open contacts 167, a pair of normally open contacts 168 and a pair of normally open contacts 169. The contacts 162 and 167 are a make and break pair as in the previous logic units. The contacts 167 will "make" or are closed before the contacts 162 open.

When the solenoid 165 closes contacts 168, a circuit from power line or bus bar 32 to a motor starting solenoid 173 is completed. The solenoid 173 is also electrically connected through a set of normally closed contacts 174 to the neutral or ground line 166.

The solenoid 173, when it is energized, closes a pair of normally open contacts 175 and motor 12 is electrically connected to power lines or bus bars 32 and 34.

A motor overload relay heater 176 is also wired in the circuit as the previous motor control circuits. The heater 176 controls normally closed contacts 174 and also a pair of normally open contacts 177 which, when they are closed, connect ground line 166 with the overload alarm line or bus bar 45.

Once the contacts 167 are closed by solenoid 165 the solenoid is energized through a 24-volt line 178 which is electrically connected to line 44 and the solenoid is locked in the on or energized position. The 24-volt line 178 is electrically connected through a suitable line to an output jack 179. As the vibrator motor 12 is the last motor in the sequence the 24-volt signal appearing at jack 179 is not utilized for further controls. However, if additional motors were added, for example, conveyors to bring grain to the bin 10, the motor controller or logic unit for the conveyors would be connected to the jack 179 in the same manner as the previous units.

Any number of motors can be started sequentially and with any predetermined time delay in between the starting of the various motors. The time delay can be determined with fixed time delay units which are commercially available or adjustable timers can be utilized.

Each of the logic units has a separate manual switch to enable the motor it controls to be manually started and run even if the automatic controls are not working. For example, the first logic unit 61 includes a manual start switch 180 for the motor 25; the second logic unit 95 includes a manual start switch 181 for motor 22; the third logic unit includes a manual on-off motor start switch 182 for controlling motor 16 and the fourth logic unit 160 includes a manual switch 183 for starting motor 12.

All of the motors are locked in the "on" position and will continue to run until a separate "stop" signal is received by the logic units.

*Stopping of motors for feeding equipment*

The complete feeding sequence will be run for a predetermined time. The length of feeding time can be adjusted through the use of timer 46. When the correct amount of time has elapsed, micro-switch 53 will be moved to position as shown in FIG. 2 and will connect 24-volt line 54 with line 200. The line 200 is connected through one side of the manual-automatic switch 47 to an output or stop cycle jack 201. The 24-volt signal carried by jack 201 will be transferred through a patch cord 202 to the stop sequence solenoid for the motor that is to be stopped first.

In the example shown, the motor 12 for the vibrating feeder, which was started last, will have to be stopped first to insure that the various other components will empty out before they are stopped. Patch cord 202 is then connected to a stop sequence input jack 203 in logic unit 160, which controls motor 12. When the 24-volt signal appears at stop cycle input jack 203 it is carried by a line 204 through contacts 169, which are closed (solenoid 165 is energized), thence through a line 205 and a set of normally closed contacts 206 to a stop sequence solenoid coil 207. The stop sequence solenoid coil 207 is electrically connected to ground line 166. The solenoid coil 207 is energized and closes a set of normally open contacts 208 and at the same time opens contacts 206 and 164. Contacts 206 and 208 are a set of make before break contacts and contacts 208 complete a circuit from line 178 to solenoid 207 before the contacts 206 are opened. The stop solenoid 207 is locked "on" or energized.

The opening of contacts 164 breaks the circuit to start sequence solenoid 165 and this solenoid is relaxed. The contacts 167, 168 and 169 are all opened and contacts 162 again close. When contacts 168 open the current to solenoid 173 is shut off and contacts 175 open thus breaking the circuit to motor 12.

Contacts 208, when closed, also connect the 24-volt line 178 to a stop cycle output jack 211. The stop sequence output jack can be connected through a suitable patch cord to a time delay input jack 212. The time delay input jack is wired as previously explained and energize a time delay heater 213 which, after a predetermined lapse of time causes contacts 214 to close and connects jack 212 to a time delay output jack 215. In this particular instance the time delay between the shutting off of motor 12 and the closing of contacts 214 to connect the signal to output jack 215 would be longer than the previous time delays. The time delay would be sufficient to permit the mill, auger and bunk feeder to empty completely and unload the motors driving them. An adjustable timer can be utilized in place of the fixed time delay heater and contacts.

The time delay output jack 215 is electrically connected through a patch cord 216 to a stop sequence or cycle input jack 217 in logic unit 126, which controls motor 16. The jack 217 is connected through a line 218, contacts 137, which are closed under the action of solenoid 131, through a pair of normally closed contacts 219 to a stop sequence solenoid coil 220. The stop sequence solenoid coil 220 is also electrically connected to ground line 134. The solenoid coil 220 is thus energized.

When the solenoid coil 220 is energized it closes a set of normally open contacts 223 and opens contacts 219. Contacts 223 make connection before contacts 219 open. Contacts 130 in line 129 to the start sequence solenoid coil 131 are opened by solenoid 220. The circuit energized start sequence solenoid 131 is broken and this solenoid relaxes. Contacts 135, 136 and 137 open and contacts 128 close. Contacts 137 open the circuit to the starting solenoid 138 of motor 16, contacts 140 open and motor 16 stops.

The solenoid coil 220 is now locked on through 24-volt line 146, and contacts 223. Contacts 223 also connect line 146 to a line 224 and to a stop cycle output jack 225. The 24-volt signal from line 146 is carried through a patch cord 226 to a stop sequence or cycle input jack 227 in second logic unit 95. The input jack 227 is electrically connected to line 230 which is connected to contacts 106 (which are closed by the action of solenoid 101), and through a set of normally closed contacts 231 to a stop sequence solenoid coil 232. Solenoid coil 232 is also electrically connected to ground line 102.

Solenoid coil 232 is thus energized and closes a set of normally open contacts 233, opens contacts 231 and opens contacts 99 in the circuit for start sequence solenoid 101. Contacts 233 close before contacts 231 open.

When contacts 99 open the circuit energized solenoid 101 is broken and this solenoid relaxes. Contacts 104, 105 and 106 open and contacts 97 are closed.

When contacts 105 open the circuit to starting solenoid 107 for motor 22 is also broken. This solenoid relaxes and contacts 109 open thus stopping motor 22.

Contacts 233 complete a circuit from 24-volt signal line 114 to stop sequence solenoid 232 and the solenoid 232 is locked on. With contacts 233 closed the 24-volt signal line 114 is also connected through a line 234 to a stop cycle output jack 235 in the logic unit 95.

A patch cord 236 is plugged into jack 235 and extends into a stop sequence or cycle input jack 237 in first logic unit 61 (FIG. 2). The 24-volt signal is then carried through a line 240, contacts 70, which are closed when the start sequence solenoid 66 is energized, and a set of normally closed contacts 241 to a stop sequence solenoid coil 242. Stop sequence or cycle solenoid coil 242 is also electrically connected to ground line 67.

Solenoid coil 242 is thus energized and closes a set of normally opened contacts 243, opens contacts 241 and opens contacts 65 in the circuit energizing start sequence solenoid 66.

As contacts 65 open, the solenoid 66 is deenergized and relaxes. Contacts 68, 69 and 70 open and contacts 64 again close.

With contacts 69 open the circuit for starting solenoid 77 of motor 25 is broken and contacts 79 open, stopping motor 25.

Contacts 243 are made so that they will close before contacts 241 open. Contacts 243 electrically connect the 24-volt signal line 73 to the solenoid coil 242 and the solenoid coil 242 is locked on. Contacts 243 also electrically connect signal line 73 with a line 244 which is electrically connected to a stop cycle output jack 245.

When the 24-volt signal appears at jack 245 motor 25 has stopped. This 24-volt signal is then carried through a patch cord 246 to a sequence complete signal jack 247 on the common control unit 30.

All of the motors driving the feeding components have been shut off in the proper order. All of the stop sequence solenoids are still energized and the logic units must be reset to be ready for the next feeding cycle. It should be noted that until the stop sequence solenoids are deenergized the motors cannot be re-started.

*Resetting circuitry*

The 24-volt signal appearing at jack 247 is carried through a line 250, a set of normally closed contacts 251, a line 252 and through a second set of normally closed heat responsive contacts 253 to a sequence complete solenoid coil 254. The solenoid coil 254 is also electrically connected to ground line 36. The solenoid 254 is thus energized.

Line 252 also is electrically connected to a time delay heater 255 which is in turn electrically connected to ground line 36.

Solenoid coil 254, as soon as it is energized closes a set of normally open contacts 256 which complete a power circuit from transformer 39 through line 38, contacts 41 and microswitch 42 to the line 252. Contacts 251 and contacts 43 are then opened by solenoid 254.

As soon as contacts 43 are opened the 24-volt signal on line or bus bar 44 disappears. The 24-volt signal in the logic units also disappears and the stop solenoids 242, 232, 220 and 207 are deenergized. These solenoids then relax and the logic units are reset to their original state ready for another cycle.

However, solenoid 254 will be locked on through the circuit completed by contacts 256. Because the time delay heater 255 will not immediately open contacts 253 but will permit the contacts 43 to be broken before the contacts 253 open. After a predetermined time delay, for example, three seconds, heater 255 causes the heat responsive contacts 253 to open. This breaks the circuit to solenoid coil 254 causing this solenoid to relax. Contacts 256 will open and then heater 255 will no longer be energized. Contacts 253 will again close. Also, contacts 43 will again be closed, their normal position, and the 24-volt signal will reappear on line or bus bar 44. The unit is then ready to be recycled whenever the timer 46 trips the proper circuit.

The cycle just described is for a normal operating cycle. However, occasionally one of the motors will malfunction or become overloaded. When this occurs some type of alarm or disabling means must be sounded so the farmer will know that a malfunction has occurred.

*Overload alarm circuit*

It will be noted that each of the motors has a overload relay coil in its circuit. For example, motor 25 has an overload relay heater 83, motor 22 has overload relay heater 110, motor 16 has overload relay heater 141, and motor 12 has overload relay heater 176. Each of these overload relay heaters operates two sets of heat responsive contacts. By way of example, the overload relay heater in the fourth motor controller for motor 12 will be explained. It is to be understood that each of the overload heaters operates in exactly the same manner and that they operate independently of one another. If any of the motors malfunction, the overload alarm circuit will work.

If motor 12, for example, becomes overloaded it draws more current than normal and the relay heater 176 will become hot. This will close heat responsive contacts 177 and open heat responsive contacts 174. The instant that contacts 177 are closed the overload alarm line 45 is connected to the neutral line 34 through line 166, contacts 177 and a line 260. Overload alarm line 45 is thus grounded. The line or bus bar 45 is connected through a line 261 (see FIG. 2) through a set of normally closed contacts 262 through a line 263 and grounds an overload alarm relay coil 264. The overload alarm relay coil is electrically connected to line 35, which is directly connected to power line 32. The overload alarm relay coil 264 controls a first set of normally open contacts 265, and a second set of normally open contacts 266, in addition to contacts 262, which are normally closed and contacts 41, which are also normally closed.

Contacts 266 and 262 are of the make before break type so that contacts 266 close before contacts 262 open. Contacts 266 connect line 263 through a manual reset button 267 to the neutral line 36. Thus the circuit to the coil 264 is completed independently of contacts 262. The coil 264 is self-energized until the manual reset button 267 is pushed.

When contacts 265 close they complete a circuit from power line 35 through an overload alarm 52. The overload alarm 52 can be either audio (such as a bell) or can be a visual signal such as a warning light.

Contacts 41 are in the main line 38 from transformer 39. With contacts 41 open all control power is shut down to the logic units and all of the motors will stop at once. The unit will not be able to operate again until the reset button 267 has been pushed to disable the alarm circuit relay coil 264.

It should be noted that each of the motors for the feeding equipment operates in the same way and the overload alarm shuts down the whole system. The manual switches for the respective motors can then be utilized for starting each motor and emptying out the various components individually before the automatic controls are again initiated. This prevents any overloading of the circuits when again restarting the system.

After the malfunctioning motor has stopped and heater 176 again cools, contacts 174 and 177 can either be reset manually or automatically as desired.

A variable timer 270 can be used with the common control circuit. The variable timer 270 will run off 110 volts but will be only actuated when the 24-volt clutch 271 is energized. If any time delay is desired between the stopping of any of the motors, for example, the patch cords can be run into a time delay input jack 272 which will energize the clutch 271. After a predetermined and present time delay contacts 274 will be closed and the 24-volt signal will appear at time delay output jack 273. The 24-volt signal at jack 273 can be utilized for any of the desired control functions.

All of the patch cords carry only 24-volts. Therefore there is no danger from receiving lethal shocks during use of the patch cords.

The safety microswitch 42, which can be for any desired safety device, is connected in the main 24-volt control circuit from transformer 39. For example the safety switch 42 could be mounted on the end of the bunk feeder 24. The switch has an actuator device thereon so that if the level of feed goes above a certain height the switch 42 would be opened and the entire control circuit would be disabled. This switch is used by way of example only and various safety switches can be installed in series in the unit to shut down the controls if any malfunction occurs.

If the timer 46 is not used the unit can be manually started and stopped. By switching the manual-automatic switch 47 to the manual position and closing the manual start switch 48 a 24-volt signal will appear at the start jack 56 and the complete starting operation of the units will be repeated. Likewise, to stop the units, switch 49 is closed, which makes a 24-volt signal appear at the stop cycle jack 201 and the stop cycle will be initiated, to shut down the units.

Through the use of only five bus bars or lines that are common to all of the motor controllers, the entire programming system can be operated. Power, control and overload signals are carried by only five lines. The programming of the feeding device is accomplished through the use of patch cords and can be expanded or modified as desired. The logic units for programming are plug-on type which are easily attached to the separate motor controllers and the motor controllers themselves are easily installed by plugging them onto the bus bars extending from the main common control unit.

What is claimed is:

1. An electric circuit for sequentially starting and stopping a plurality of electric motors, said circuit including a pair of motor power lines extending from a source of electric power, a motor starter circuit for each motor including a motor starter relay having a motor starter solenoid and having motor starter contacts for connecting said motor to said power lines when said motor starter solenoid is energized, a pair of control lines extending from a source of electric power, a start sequence relay for each motor having a start sequence solenoid connected at a first end thereof to a first of said control lines and having first, second and third sets of normally open start sequence contacts and a fourth set of normally closed start sequence contacts adapted to remain closed until said first set of start sequence contacts becomes closed upon energization of said start sequence solenoid, a stop sequence relay for each motor having a stop sequence solenoid connected at a first end thereof to said first control line and having a first set of normally open stop sequence contacts and second and third sets of normally closed stop sequence contacts, said third set of stop sequence contacts being adapted to remain closed until said first set of stop sequence contacts becomes closed upon energization of said stop sequence solenoid, an electrical connection for each motor from a power source to said motor starter solenoid by way of said third set of start sequence contacts, an electrical connection from a second of said control lines to a first side of each of said first start sequence and first stop sequence contacts, an electrical connection from a second side of said start sequence solenoid to a first side of said second stop sequence contacts, an electrical connection from a second side of said stop sequence solenoid to a second side of said first stop sequence contacts and to a first side of said third stop sequence contacts, a common electrical connection between a second side of said second start sequence contacts and said third stop sequence contacts, a common electrical connection between second sides of said first and fourth start sequence contacts and a second side of said second stop sequence contacts, common starter control means selectively operable to connect a first side of said fourth set of start sequence contacts of the first motor to be started to said second control line, start jumper lines from said second side of said fourth start sequence contacts of each of said motors except the last to be started to the first side of the fourth start sequence contacts of the next motor to be started, common stop control means selectively operable to connect a first side of said second start sequence contacts of the first motor to be stopped to said second control line, and stop jumper lines from said second side of said first stop sequence contacts of each of said motors except the last to be stopped to the first side of said second start sequence contacts of the next motor to be stopped.

2. The combination as specified in claim 1 and a time delay means normally interrupting at least one of said start jumper lines, said time delay means being operative concurrently with the energization of the start sequence solenoid associated with the first to start motor of the two motor circuits with which the jumper is associated and to close said jumper after a predetermined time delay.

3. The combination as specified in claim 1 wherein at least one of said stop jumpers is normally interrupted by a time delay mechanism, said mechanism being operative simultaneously with the energization of the stop sequence solenoid of the first motor to be stopped of the two motors with which the jumper is associated to complete the circuit through the jumper after a predetermined time delay.

4. The combination as specified in claim 1 and second disabling means including a second pair of disabling contacts in said second control line between said previously mentioned disabling contacts and said source of electric power, a second disabling solenoid controlling said disabling contacts, and a separate pair of normally open overload contacts in each motor circuit, said overload contacts being adapted to close when its associated motor becomes overloaded and complete a circuit to energize said second disabling solenoid, locking circuit means to retain said second disabling solenoid in position with said second disabling contacts open, and manual reset means to open the locking circuit means to said second disabling solenoid.

5. The combination as specified in claim 4 and alarm means actuated in response to completion of the circuit to said second disabling solenoid.

6. An electric circuit for sequentially starting and stopping a plurality of electric motors, said circuit including a pair of motor power lines extending from a source of electric power, a motor starter circuit for each motor including a motor starter relay having a motor starter solenoid and having motor starter contacts for connecting said motor to said power lines when said motor starter solenoid is energized, a pair of control lines extending from a source of electric power, a start sequence relay for each motor having a start sequence solenoid connected at a first end thereof to a first of said control lines and having first, second and third sets of normally open start sequence contacts and a fourth set of normally closed start sequence contacts adapted to remain closed until said first set of start sequence contacts becomes closed upon energization of said start sequence solenoid, a stop sequence relay for each motor having a stop sequence solenoid connected at a first end thereof to said first control line and having a first set of normally open stop sequence contacts and second and third sets of normally closed stop sequence contacts, said third set of stop sequence contacts being adapted to remain closed until said first set of stop sequence contacts becomes closed upon energization of said stop sequence solenoid, an electrical connection for each motor from a power source to said motor starter solenoid by way of said third set of start sequence contacts, an electrical connection from a second of said control lines to a first side of each of said first start sequence and first stop sequence contacts, an electrical connection from a second side of said start sequence solenoid to a first side of said second stop sequence contacts, an electrical connection from a second side of said stop sequence solenoid to a second side of said first stop sequence contact and to a first side of said third stop sequence contacts, a common electrical connection between second sides of said second start sequence contacts and said third stop sequence contacts, a common electrical connection between second sides of said first and fourth start sequence contacts and a second side of said second stop sequence contacts, common starter control means selectively operable to connect a first side of said fourth set of start sequence contacts of the first motor to be started to said second control line, start jumper lines from said second side of the fourth start sequence contacts of the next motor to be started, common stop control means selectively operable to connect a first side of said second start sequence contacts of the first motor to be stopped to said second control line, stop jumper lines from said second side of said first stop sequence contacts of each of said motors except the last to be stopped to the first side of said second start sequence contacts of the next motor to be stopped, and means to disable said common start control means and said common stop control means responsive to the stopping of all of the motors including a disabling jumper from the first side of the third stop sequence contacts of the last motor to stop to a disabling circuit including a pair of first disabling contacts in said second control line between said source of electric power and all other contacts of said circuit, and a first disabling solenoid connected between said disabling jumper and said first control.

7. The combination as specified in claim 6 wherein said first disabling means includes an interlock circuit including a pair of normally closed time delay contacts in series with said first disabling solenoid, said first disabling solenoid having a first set of normally closed contacts and a second set of normally open contacts, a circuit through said disabling jumper, said first set of normally closed contacts, said normally closed timer contacts, said first disabling solenoid coil and the first control line, a lock up circuit from the second control line, through said second normally open contacts, and to a point between said normally closed contacts and said timer contacts, and means for opening the timer delay contacts a predetermined time after said first disabling solenoid is energized.

References Cited in the file of this patent

UNITED STATES PATENTS

| | | |
|---|---|---|
| 1,620,531 | Fisher | Mar. 8, 1927 |
| 2,108,143 | Saunders | Feb. 15, 1938 |
| 3,064,170 | Moran | Nov. 13, 1962 |

FOREIGN PATENTS 746,601   Great Britain _____ Mar. 14, 1956

OTHER REFERENCES

Publication: "Low Voltage Flexible Sequence Controls," South Dakota State College, Bulletin No. 500, 18 pages, October 1961.